(12) United States Patent
Youm et al.

(10) Patent No.: US 11,210,944 B2
(45) Date of Patent: Dec. 28, 2021

(54) SYSTEM, SERVER AND METHOD FOR INFORMATION PROVISION

(71) Applicant: Samsung Electronics Co., Ltd., Suwon-si (KR)

(72) Inventors: Sun Hee Youm, Suwon-si (KR); Jae Won Kim, Suwon-si (KR); Beom Seok Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/648,477

(22) PCT Filed: Nov. 7, 2018

(86) PCT No.: PCT/KR2018/013456
§ 371 (c)(1),
(2) Date: Mar. 18, 2020

(87) PCT Pub. No.: WO2019/107782
PCT Pub. Date: Jun. 6, 2019

(65) Prior Publication Data
US 2020/0234584 A1 Jul. 23, 2020

(30) Foreign Application Priority Data

Nov. 30, 2017 (KR) .......................... 10-2017-0163408

(51) Int. Cl.
*G08G 1/09* (2006.01)
*G08G 1/0967* (2006.01)
(Continued)

(52) U.S. Cl.
CPC ........ *G08G 1/09675* (2013.01); *B60S 1/0822* (2013.01); *G01C 21/28* (2013.01);
(Continued)

(58) Field of Classification Search
CPC ...... B60S 1/0818; B60S 1/0822; G01C 21/28; G01C 21/3685; G01C 21/3694;
(Continued)

(56) References Cited

U.S. PATENT DOCUMENTS

| 9,681,287 B2 | 6/2017 | Yang et al. |
| 9,918,001 B2 | 3/2018 | Pisz |
| 2009/0326760 A1* | 12/2009 | Clark ................ B60H 1/00821 701/36 |

FOREIGN PATENT DOCUMENTS

| JP | 2017-134751 A | 8/2017 |
| KR | 10-2012-0003115 A | 1/2012 |

(Continued)

*Primary Examiner* — Nader Bolourchi
(74) *Attorney, Agent, or Firm* — Jefferson IP Law, LLP

(57) ABSTRACT

Disclosed are a system, a server, and a method for information provision. A method for information provision includes receiving, from a terminal device of a vehicle, sensing information and location information detected by the terminal device of the vehicle, generating present environment condition information by regions by using the received sensing information and location information, and based on a service request being received from the terminal device of the vehicle, transmitting the environment condition information to the terminal device of the vehicle. Accordingly, a server may provide, on a real-time basis, environment condition information related to weather using sensing information detected by a terminal device of a vehicle.

13 Claims, 10 Drawing Sheets

(51) Int. Cl.
*H04W 4/38* (2018.01)
*H04W 4/44* (2018.01)
*B60S 1/08* (2006.01)
*G01C 21/28* (2006.01)
*G01W 1/02* (2006.01)
*G07C 5/00* (2006.01)
*H04W 4/021* (2018.01)

(52) U.S. Cl.
CPC ............... *G01W 1/02* (2013.01); *G07C 5/008* (2013.01); *H04W 4/021* (2013.01); *H04W 4/38* (2018.02); *H04W 4/44* (2018.02)

(58) Field of Classification Search
CPC ............ G01C 21/3697; G01W 1/02; G01W 2001/006; G06F 11/30; G06Q 50/10; G07C 5/008; G07C 5/0841; G08G 1/09675; G08G 1/096816; G08G 1/143; H04W 4/021; H04W 4/024; H04W 4/027; H04W 4/38; H04W 4/40; H04W 4/44; H04W 4/80
See application file for complete search history.

(56) References Cited

FOREIGN PATENT DOCUMENTS

| | | |
|---|---|---|
| KR | 10-2014-0027647 A | 3/2014 |
| KR | 10-1470313 B1 | 12/2014 |
| KR | 10-2015-0059023 A | 5/2015 |
| KR | 10-2017-0042772 A | 4/2017 |
| KR | 10-2017-0064250 A | 6/2017 |
| KR | 10-1741601 B1 | 6/2017 |
| KR | 10-1744963 B1 | 6/2017 |
| KR | 10-2017-0131094 A | 11/2017 |

* cited by examiner

SYSTEM, SERVER AND METHOD FOR INFORMATION PROVISION

TECHNICAL FIELD

The disclosure relates to a system, a server, and a method for information provision. More particularly, the disclosure relates to a system, a server, and a method for information provision using various sensing information collected by a terminal device of a vehicle.

BACKGROUND ART

In general, a user checks present weather for each region through weather information provided from a weather center.

A weather center providing weather-related meteorological information observes weather in a predetermined time basis and provides the observed result as weather information.

Accordingly, when a user searches a weather condition for a specific region, the weather center provides weather information observed at a specific time, rather than providing weather information observed at the time the user searches.

Accordingly, there is a problem that a user may not recognize accurate weather state of the searched region.

By the recent development of various information technology (IT), a user can be provided with weather information for each region through a social network service (SNS).

However, weather information provided by the SNS is provided by a user using the SNS so that weather information for all regions may not be provided.

In other words, users using the SNS are not distributed in all regions and thus, there is a problem in that the local deviation of weather information provided through the SNS is generated.

DISCLOSURE

Technical Problem

The disclosure provides a real-time weather-related environment condition information by using sensing information detected by a terminal device of a vehicle.

The disclosure provides various environment condition information by regions on a real-time basis using various sensing information detected by a terminal device of a vehicle.

Technical Solution

According to an embodiment, a method for information provision includes receiving, from a terminal device of a vehicle, sensing information and location information detected by the terminal device of the vehicle, generating present environment condition information by regions by using the received sensing information and location information, and based on a service request being received from the terminal device of the vehicle, transmitting the environment condition information to the terminal device of the vehicle.

The sensing information may include at least one of raindrop detection information, wiper operation information, illuminance information, atmospheric pollution, or temperature information, and the environment condition information may include present weather information by the regions.

The transmitting may include, based on a service request comprising location information being received from the terminal device of the vehicle, obtaining environment condition information of a region related to the location information of the vehicle and transmitting the obtained environment condition information to the terminal device of the vehicle.

The transmitting may include, based on a service request comprising destination information being received from the terminal device of the vehicle, obtaining environment condition information of a region related to the destination information of the vehicle and transmitting the obtained environment condition information to the terminal device of the vehicle.

The transmitting may include, based on a service request comprising information on a moving route from a present location to a destination being received from the terminal device of the vehicle, obtaining environment condition information by regions related to the moving route information and transmitting the obtained environment condition information to the terminal device of the vehicle.

The sensing information may further include at least one of air pressure information, vibration intensity information, acceleration information, capturing information, or infrared sensing information, and the generating may include classifying the sensing information by predetermined domains and generating environment condition information by the domains based on the sensing information classified by the domains and the location information.

The domain may include at least one of a weather information service domain, an atmospheric information service domain, a parking information service domain, a traffic information service domain, or a risk occurrence service domain.

The transmitting may include, based on a service request being received from the terminal device of the vehicle, determining a domain corresponding to the received service request and transmitting the environment condition information corresponding to the service request of the vehicle to the terminal device of the vehicle on the determined domain.

According to a still another embodiment, a server includes a communicator configured to communicate with a terminal device of a vehicle, and a processor configured to, based on sensing information and location information detected by the terminal device of the vehicle being received through the communicator, generate present environment condition information by regions using the received sensing information and location information, and based on a service request being received from the terminal device of the vehicle, control the communicator to transmit the environment condition information to the terminal device of the vehicle.

The sensing information may include at least one of raindrop detecting information, wiper operation information, illuminance information, atmospheric pollution information, or temperature information, and the environment condition information may include present weather information by the regions.

The processor is configured to, based on a service request comprising destination information being received from the terminal device of the vehicle, obtain environment condition information of a region related to the destination information of the vehicle, and control the communicator to transmit the obtained environment condition information to the terminal device of the vehicle.

The processor is configured to, based on a service request comprising information on a moving route being received from the terminal device of the vehicle, obtain environment condition information related to the destination information of the vehicle and control the communicator to transmit the obtained environment condition information to the terminal device of the vehicle.

The processor is configured to, based on a service request comprising information on a travel route received from the terminal device of the vehicle, obtain environment condition information by regions related to the travel route information and control the communicator to transmit the obtained environment condition information to the terminal device of the vehicle.

The sensing information may further include at least one of air pressure information, vibration intensity information, acceleration information, capturing information, or infrared sensing information, and the processor is configured to classify the sensing information by determined domains and generate environment condition information by domains based on the sensing information classified by domains and the location information.

The domain may include at least one of a weather information service domain, an atmospheric information service domain, a parking information service domain, a traffic information service domain, or a risk occurrence service domain.

The processor may, based on a service request being received from the terminal device of the vehicle, determine a domain corresponding to the received service request and control the communicator to transmit the environment condition information corresponding to the service request of the vehicle to the terminal device of the vehicle on the determined domain.

According to still another embodiment, the information provision system includes a terminal device mounted in a vehicle for detecting a condition of the vehicle and a surrounding environment condition and a server configured to, based on receiving location information of the vehicle and sensing information on the detected vehicle and the surrounding environment condition from the terminal device, generate present environment condition information by regions using the received location information and sensing information, and based on receiving a service request from a terminal device of a vehicle, transmit the environment condition information to a terminal device of the vehicle.

The sensing information may include at least one of raindrop detecting information, wiper operation information, illuminance information, atmospheric pollution information, or temperature information, and the environment condition information comprises present weather information by regions.

The sensing information may further include at least one of air pressure information, vibration intensity information, acceleration information, capturing information, or infrared sensing information, and the environment condition information may further include at least one of atmospheric information, parking information, traffic information, or risk occurrence information by the reasons.

The terminal device includes a communicator, a display, a detector configured to sense a condition of the vehicle and a surrounding environment condition, and a processor configured to control the communicator to transmit sensing information detected by the detector and the location information of the vehicle to a server, and according to a user command, based on receiving present environment condition information by regions generated based on the sensing information and location information received from the plurality of vehicles from the server, control the display to display the received environment condition information.

Advantageous Effects

According to the disclosure, a server may provide, on a real-time basis, environment condition information related to weather by regions using sensing information detected by a terminal device of a vehicle.

DETAILED DESCRIPTION OF EXEMPLARY EMBODIMENTS

Figure 1:
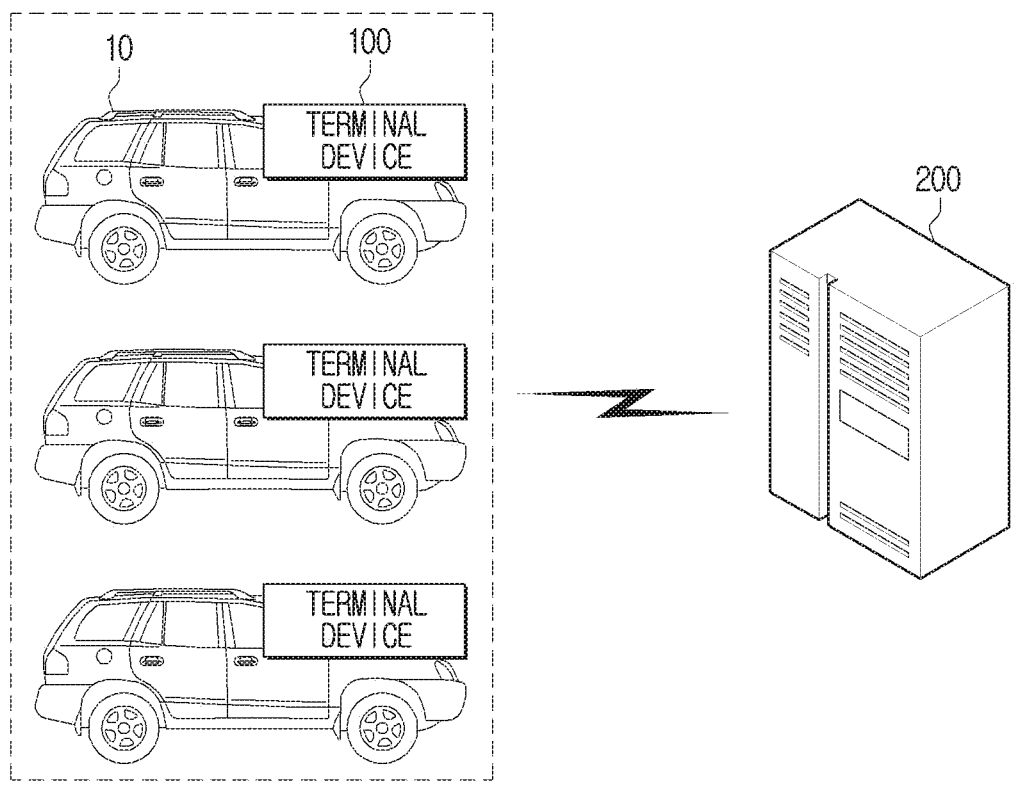
FIG. 1 is an exemplary diagram illustrating information provision system according to an embodiment.

Before specifically describing the disclosure, a method for demonstrating the present specification and drawings will be described.

The terms used in the present disclosure and the claims are general terms identified in consideration of the functions of the various example embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

Singular expressions are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

The terms such as "module," "unit," "part," and so on refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

Also, when any part is connected to another part, this includes a direct connection and an indirect connection through another medium. Further, when a certain portion includes a certain element, unless specified to the contrary, this means that another element may be additionally included, rather than precluding another element.

Various embodiments will be described in detail with reference to the attached drawings.

FIG. 1 is an exemplary diagram illustrating information provision system according to an embodiment.

As illustrated in FIG. 1, the information provision system includes a terminal device 100 and a server 200.

The terminal device 100 can be mounted within a vehicle 10 to provide a driver with travel route information to a destination, driving information, or the like, sense an operating state of the running vehicle 10 and a surrounding road state, and provide a driver with the sensed sensing information.

The terminal device 100 may transmit sensed sensing information to a server 200 by performing data communication with the server 200 to be described, receive environment condition information generated based on the sensing information received from the terminal device 100 of a plurality of vehicles 10 and provide the information to the driver. The terminal device 100 may transmit the location information of the vehicle 10 to the server 200, along with the sensed sensing information.

The sensing information may include at least one of information about surrounding environmental information such as raindrop sensing information, wiper operation information, illuminance information, atmospheric pollution information, and status information of the vehicle 10 such as air pressure information, vibration intensity information, acceleration information, photographing information, infrared sensing information, or the like.

The terminal device 100 may perform data communication with a portable terminal device such as a smartphone of a driver and transceiver various information requested by the driver with a portable terminal device.

The server 200 may receive location information of the vehicle 10 and the sensing information sensed from the terminal device 100 of the plurality of vehicles 10 and generate present environment condition information of each region based on the received sensing information and location information.

Environment condition information may include at least one of present weather information by regions, atmospheric information, parking information, traffic information, or risk information.

After a service request is received from at least one terminal device 100 among the terminal devices 100 of the plurality of vehicles 10, the server 200 transmits the environment condition information related to the received service request to the terminal device 100 requesting the service.

The embodiment is not limited thereto, and the server 200 may periodically transmit the pre-generated present environment condition information of each region to the terminal device 100 of the plurality of vehicles 10.

The server 200 may periodically receive location information of the vehicle 10 from the terminal devices 100 of the plurality of vehicles 10 and transmit the environment condition information of a region in which the corresponding vehicle 10 is positioned to the terminal device 100 based on the received location information.

After the server 200 transmits the environment condition information of a specific region to at least one terminal device of the plurality of vehicles, if it is determined that the environment condition information of the corresponding region is changed, the server 200 can retransmit the changed environment condition information of the corresponding region.

For example, when the weather of region A is changed from sunny weather to rainy weather, the server 200 may transmit the changed environment condition information related to weather of A region to the terminal device 100 of the vehicle 10 which transmitted the environment condition information related to the weather of A region.

The information provision system has been briefly described. Hereinafter, the terminal device 100 of the vehicle 10 forming the information provision system and the server 200 will be described in greater detail.

Figure 2:
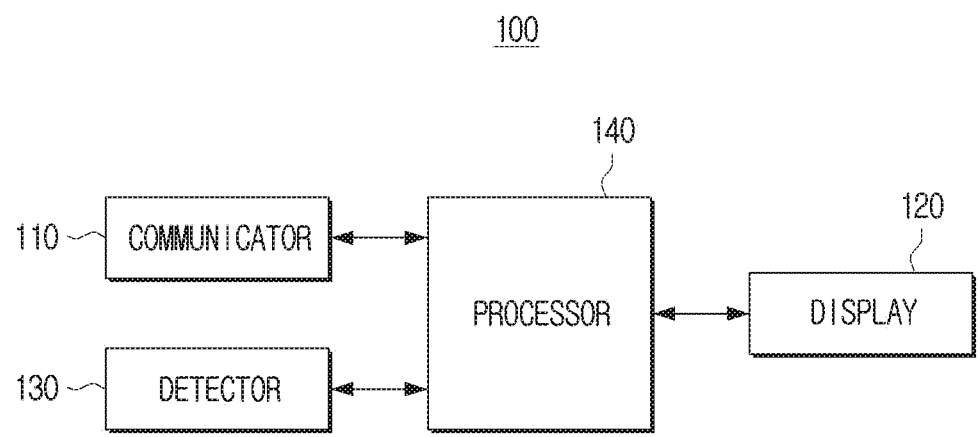
FIG. 2 is a schematic block diagram of a terminal device mounted in a vehicle according to an embodiment.
Figure 3:
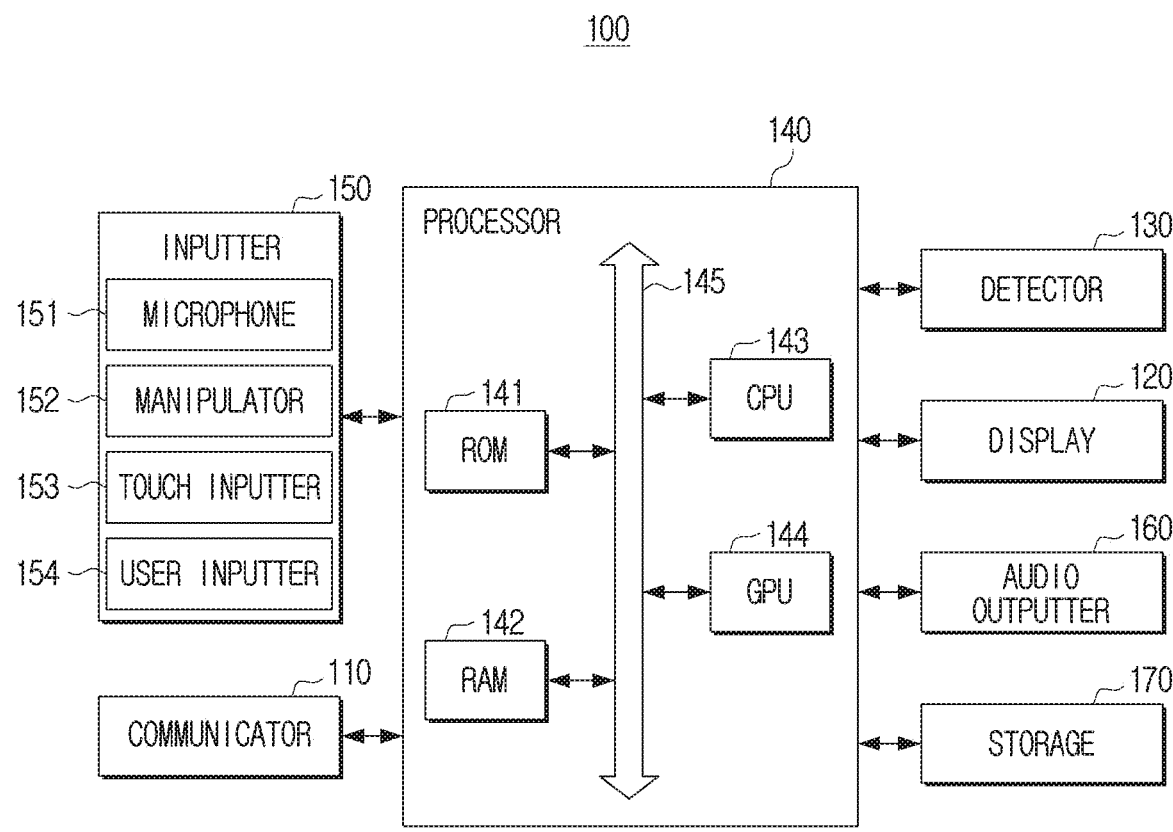
FIG. 3 is a detailed block diagram of a terminal device mounted in a vehicle according to an embodiment.

FIG. 2 is a schematic block diagram of a terminal device mounted in a vehicle according to an embodiment and FIG. 3 is a detailed block diagram of a terminal device mounted in a vehicle according to an embodiment.

As illustrated in FIG. 2, the terminal device 100 mounted in the vehicle 10 includes a communicator 110, a display 120, a detector 130, and a processor 140.

The communicator 110 performs communication with at least one of the server 200 or a portable terminal device (not shown) of a driver.

The communicator 110 may be implemented as a communication module such as a local area wireless communication module (not shown), a wireless communication module (not shown), or the like. Here, the local area wireless communication module (not shown) is a communication module for performing wireless communication with a portable terminal device (not shown) of a driver and may include, for example, Bluetooth, Zigbee, near field communication (NFC), or the like.

The wireless communication module (not shown) may access the mobile communication network according to various communication specifications such as Wi-Fi, $3^{rd}$ generation (3G), 3rd generation partnership project (3GPP), long term evolution (LTE), or the like, and perform communication with the server 200 and the terminal device 100 of another vehicle 10, or the like.

The display 120 may display at least one of condition information and path information of the vehicle 10 being driven, or display a control UI screen related to the driving of the vehicle 10. In addition, the display 120 may display image data of content received from a portable terminal device (not shown) of a driver or pre-stored content.

The display 120 may be implemented as a liquid crystal display (LCD), an organic light emitting diode (OLED), or the like. In particular, when an inputter 150, which will be described later, includes a touch input unit (not shown) capable of inputting a touch of a user, the display 121 can be implemented in a form of a touch screen that forms an inter-layer structure with a touch inputter (not shown).

The detector 130 may detect the condition of the vehicle 10 and the surrounding environment condition, and transmit the detected sensing information to the processor 140 to be described later.

The sensing information may include condition information of the vehicle 10 including at least one of air pressure information, vibration intensity information, acceleration information, photographing information, or infrared detecting information of the vehicle, and surrounding environment information including at least one of raindrop sensing information, wiper operation information, illuminance information, or atmospheric pollution information.

The detector 130 for detecting the condition information of the vehicle 10 and the surrounding environment condition may include the air pressure sensor, a shock sensor, an acceleration sensor, an infrared detecting sensor, an image sensor, a raindrop sensor, an illuminance sensor, an atmospheric pollution detection sensor, or the like.

The air pressure sensor is a sensor for detecting the air pressure condition of a tire of the vehicle 10 and the shock sensor is a sensor for detecting a vibration condition of the vehicle 10 which is driving on a road.

The acceleration sensor is a sensor for detecting a driving speed of the vehicle 10, and the infrared detecting sensor is a sensor for detecting a distance with an object in left, right, front, rear directions with respect to the vehicle 10, and the image sensor may be a sensor for capturing an image through a camera (not shown).

The raindrop sensor is a sensor for detecting the amount of rainwater, the illuminance sensor is a sensor for detecting the amount of light, and the atmospheric pollution detecting sensor is a sensor for measuring the concentration of carbon dioxide ($CO_2$) inside and outside the vehicle 10.

The detector 130 may further include a geomagnetic sensor for detecting a location of the vehicle 10, a gravity sensor, a detecting sensor for detecting lane departure, a proximity sensor for detecting proximity of a nearby vehicle, or the like.

The sensor is a well-known art and thus will not be described in a greater detail.

The processor 140 controls overall operation of the configurations forming the terminal device 100.

When the sensing information is detected by the detector 130, the processor 140 controls the communicator 110 to transmit the sensing information and the present position information of the vehicle 10 detected by the detector 130 to the server 200.

The communicator 110 transmits the sensing information and the present position information of the vehicle 10 detected by the detector 130 to the server 200.

When a service corresponding to a user command is requested to the server 200 and environment condition information is received from the server 200, the processor 140 controls the display 120 to display the received environment condition information.

The display 120 thus may display the environment condition information received from the server 200 on a screen.

Specifically, the server 200 generates present environment condition information for each region based on the received sensing information and the location information when the sensing information and the location information of each of the plurality of vehicles 10 are received from the terminal device 100 of the plurality of vehicles 10.

An operation to generate environment condition information of each region will be described in greater detail below.

When a service request is received from the terminal device 100 of the vehicle 10, the server 200 transmits environment condition information related to the received service request among the pre-generated present environment condition information for each region to the terminal device 100 of the vehicle 10 requesting the environment condition information related to the received service request.

Accordingly, the display 120 may display the environment condition information received from the server 200 on a screen.

The environment condition information may include at least one of present weather information of each region, atmospheric information, parking information, traffic information, or risk occurrence information. The driver of the vehicle 10 may easily and quickly recognize an environment condition of a present region or a specific region based on the environment condition information displayed on the screen.

The terminal device 100 of the vehicle 10 may further include an inputter 150, an audio outputter 160, and a storage 170 as illustrated in FIG. 3, in addition to the aforementioned configurations.

The inputter 150 is an input means for receiving various user commands and transmitting the commands to the controller 130, and may include a microphone 151, a manipulator 152, a touch inputter 153, and a user inputter 154 as illustrated in FIG. 3.

The microphone 151 may receive a user command of a user, and the manipulator 151 may be implemented as a key pad including various function keys, number keys, special keys, character keys, or the like.

When the display 120 is implemented in a form of a touch screen, the touch inputter 153 may be implemented as a touch pad that forms a mutual layer structure with the display 120. In this case, the touch inputter 153 may receive a selection command for various application-related icons displayed through the display 120.

The user inputter 154 may receive an infrared (IR) signal or radio frequency (RF) signal for controlling an operation of the terminal device 100 from at least one peripheral device (not shown) such as a remote control device.

The audio outputter 160 is configured to output an audio of content.

The storage 170 may store map information for guiding a route of a user, information on a path pre-registered by a user, content, or the like. Further, the storage 170 may further store an operation program for controlling the operation of the terminal device 100. The operation program may be a program that is read in the storage 170 and compiled to operate each configuration of the terminal device 100 when the terminal device 100 is turned on. The storage 170 may be implemented as at least one of a read-only memory (ROM) 141, a random access memory (RAM) 142, a memory card (e.g., a secure digital (SD) card, a memory stick, etc.) capable of being attached to or detached from the terminal device 100, various non-volatile memories, a volatile memory, a hard disk drive (HDD), or a solid state drive (SSD), or the like.

The processor 140 may be a processing device for controlling overall operations of the terminal device 100 or making overall operations of the terminal device 100 be controlled. The processor 140 may include a central processing unit (CPU) 143, the ROM 141, the RAM 142, and a graphics processing unit (GPU) 144. The CPU 143, ROM 141, RAM 142, and GPU 144 may be interconnected through a bus 145.

Hereinbelow, each configuration of the server will be described in greater detail.

Figure 4:
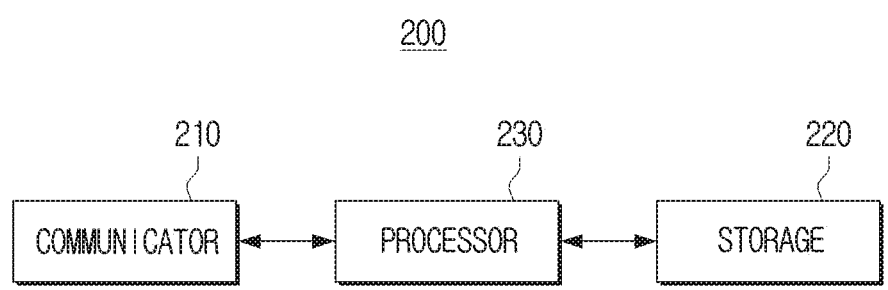
FIG. 4 is a block diagram of a server according to an embodiment.

FIG. 4 is a block diagram of a server according to an embodiment.

As illustrated in FIG. 4, the server 200 includes a communicator 210, a storage 220, and a processor 230.

The communicator 210 may perform data communication with the terminal device 100 by a plurality of devices 10 through a wired or wireless communication module (not shown) and receive detected sensing information and location information of the vehicle 10 from the terminal devices 100 of the plurality of devices 10.

However, the embodiment is not limited thereto, and the communicator 210 can receive traffic-related information by performing data communication with a capturing (not shown) such as a closed circuit television (CCTV) for monitoring traffic conditions on the road, a traffic management server (not shown), or the like, or can receive weather-related information by performing data communication with the meteorological administration server (not shown) and an SNS server (not shown).

The storage 220 stores sensing information received from the terminal device 100 by a plurality of vehicles 10 received through the communicator 210 and the location information of the vehicle 10. The storage 220 may store the generated present environment condition information by regions based on the received sensing information and location information.

The storage 220 may store an exercise program to operate each configuration of the server 200.

The processor 230 controls overall operations of the configurations forming the server 200.

When the sensing information detected by the terminal device 100 of the plurality of vehicles 10 and the location information of the vehicle 10 are received through the communicator 210, the processor 230 generates present environment condition information for each region using the received sensing information and the location information. Thereafter, the processor 230 stores the generated present environment condition information for each region in the storage 220. At this time, if the present environment condition information for each region is newly generated, the processor 230 may update the environment condition information of the corresponding region stored in the storage 220 with the newly generated environment condition information and store the updated environment condition information in the storage 220.

When a service request is received from at least one of the terminal devices 100 of the plurality of vehicles 10, the processor 230 controls the communicator 210 to transmit the environment condition information to the terminal device 100 requesting the service.

The communicator 210 may transmit the environment condition information to the terminal device 100 of the vehicle 10 requesting the service.

The sensing information detected by the terminal device 100 by the vehicles 10 may include at least one of the raindrop detecting information, wiper operation information, illuminance information, atmospheric pollution information, and the environment condition information may include the present weather information of each region.

The processor 230 may transmit the environment condition information to the terminal device 100 of the vehicle 10 requesting the service through an embodiment shown below.

According to one embodiment, when a service request including location information of the vehicle 10 is received from the terminal device 100 of the vehicle 10, the processor 230 obtains environment condition information of a region associated with the received location information among the pre-stored plurality of environment condition information. Thereafter, the processor 230 controls the communicator 210 to transmit the pre-obtained environment condition information to the terminal device 100 requesting the service.

The communicator 210 may transmit the environment state information to the terminal device 100 requesting a service.

According to another embodiment, when a service request including destination information is received from the terminal device 100 of the vehicle 10, the processor 230 obtains environment condition information of a region associated with the destination information of the vehicle 10 among the stored plurality of environment condition information. The processor 230 controls the communicator 210 to transmit the pre-obtained environment condition information to the terminal device 100 requesting the service.

The communicator 210 may transmit the environment condition information to the terminal device 100 requesting the service.

According to another embodiment, when a service request including travel route information from a terminal device 100 of the vehicle 10 to a destination is received from the terminal device 100 of the vehicle 10, the processor 230 obtains environment condition information for each region related to the movement path information. Thereafter, the processor 230 controls the communicator 210 to transmit the pre-obtained state information to the terminal device 100 requesting the service.

The communicator 210 may transmit the environment condition information to the terminal device 100 requesting the service.

According to additional aspects, the sensing information may include at least one of air pressure information, vibration intensity information, acceleration information, capturing information, or infrared sensing information of the vehicle 10, in addition to the information described above.

The processor 230 may classify the sensing information received from the terminal devices 100 by the plurality of vehicles 10 by predetermined domains, and generate the environment condition information by domains based on the sensing information classified by domains and the location information of the vehicle 10.

The domain may include at least one of the weather information service domain, atmospheric information service domain, parking information service domain, traffic information service domain, and risk occurrence service domain.

For example, when the sensing information related to the raindrop detecting information is received from the terminal device 100 of the vehicle 10, the processor 230 may classify the received sensing information into the weather information service domain, and if the sensing information related to the atmospheric pollution information is received, the processor 230 may classify the received sensing information into the atmospheric information service domain. When the acceleration information is received from the terminal device 100 of the vehicle 10, the processor 230 may classify the received sensing information into a traffic information service domain.

When the service request is received from the terminal device 100 of the vehicle 10, the processor 230 may determine a domain corresponding to the received service request and obtain the environment condition information corresponding to the service request on the determined domain. The processor 230 controls the communicator 210 to transmit the pre-obtained environment condition information to the terminal device 100 of the vehicle 10.

The communicator 210 may transmit the environment condition information to the terminal device 100 requesting the service.

An operation of providing the received environment condition information in relation to the service requested by a user from the server 200 in the terminal device 100 in the vehicle 10 will be described in greater detail.

Figure 5:
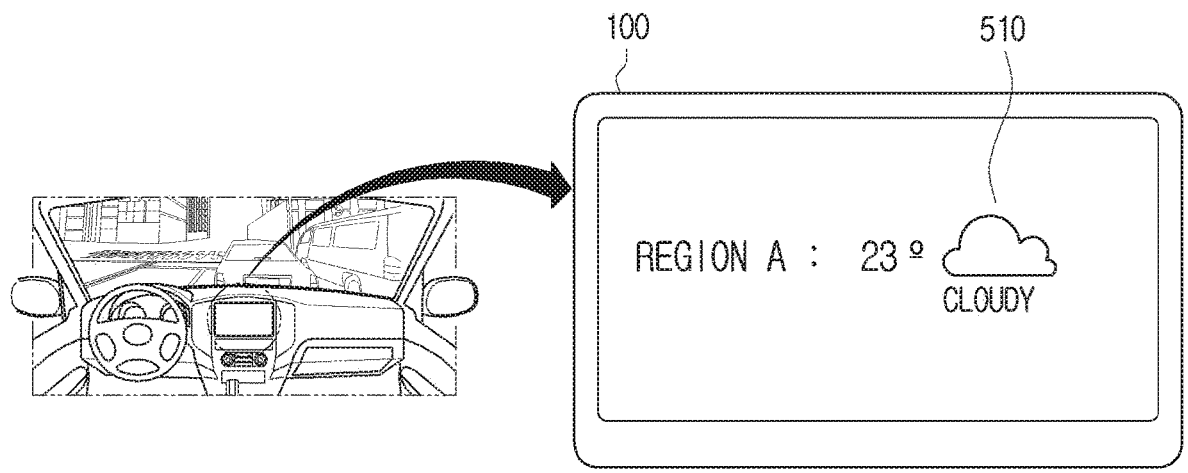
FIG. 5 is an exemplary diagram providing environment condition information according to a service request in a terminal device according to an embodiment.

FIG. 5 is an exemplary diagram providing environment condition information according to a service request in a terminal device according to an embodiment.

As illustrated in FIG. 5, the terminal device 100 of the vehicle 10 may display a weather UI 510 on a screen based on the environment condition information received from the server 200.

When the driving of the vehicle 10 begins, the terminal device 100 of the vehicle 10 periodically transmits the service request including the location information for the present location of the vehicle 10 to the server 200.

Accordingly, the server 200 obtains environment condition information of a region related to the location information included in the service request among the present environment condition information for each region generated based on the sensing information received from the terminal device 100 of the plurality of vehicles 10 and the location information for each vehicle 10 based on the location information included in the received service request.

The server 200 transmits the obtained environment condition information to the terminal device 100 of the vehicle 10 transmitting the service request.

The obtained environment condition information may include present weather information of the corresponding region.

When the environment condition information is received from the server 200, the terminal device 100 of the vehicle 10 may display the weather UI 510 of the region in which the current vehicle 10 is located on the screen, based on the weather information included in the received environment condition information.

However, the embodiment is not limited thereto, and when the environment condition information is received from the server 200, the terminal device 100 of the vehicle 10 can output the weather condition of the region where the current vehicle 10 is located as the audio based on the weather information included in the received environment condition information.

The terminal device of the vehicle 10 may provide not only the aforementioned environment condition information but also environment condition information corresponding to a predetermined service request by a user.

For example, when a driver sets a traffic-related service request for a travel route mainly used by the driver, the terminal device 100 of the vehicle 10 can transmit a service request including pre-registered travel route information and current location information of the vehicle 10 to the server 200 when the vehicle 10 starts driving.

In this case, the server 200 obtains environment condition information including traffic information on a travel route from a present location of the vehicle 10 to a destination among the generated plurality of environment condition information based on the travel route information included in the received service request and the present location information of the vehicle 10. Thereafter, the server 200 transmits the environment condition information including traffic information to the terminal device 100 of the vehicle 10 that transmitted the service request.

The terminal device 100 of the vehicle 10 may display the traffic condition on the predetermined travel route as a UI on a screen or output as audio based on the environment condition information received from the server 200.

Figure 6:
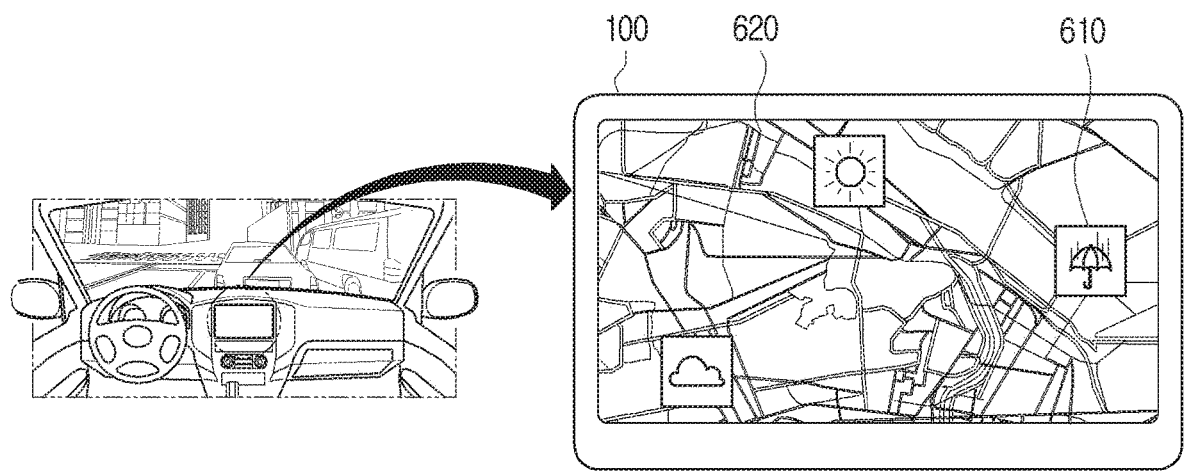
FIG. 6 is an exemplary diagram providing environment condition information according to a service request in a terminal device according to a still another embodiment.

FIG. 6 is an exemplary diagram providing environment condition information according to a service request in a terminal device according to a still another embodiment.

As illustrated in FIG. 6, the terminal device 100 of the vehicle 10 may display a weather UI 610 on a screen based on the environment condition information received from the server 200.

According to an embodiment, the terminal device 100 of the vehicle 10 may transmit the service request including the travel route information from a present location of the vehicle 10 to the destination set by the user to the server 200.

Accordingly, the server 200 obtains environment condition information including the present weather information of a region through which the vehicle 10 passes based on the travel route information included in the received service request among the pre-stored plurality of environment condition information, and transmits the obtained environment condition information to the terminal device 100 of the vehicle 10 that transmitted the service request.

Specifically, the server 200 may classify sensing information and location information received from the terminal device 100 of the plurality of vehicles 10 by domain, and generate the environment condition information for each domain based on sensing information and location information classified by domains.

Accordingly, when a service request including travel route information is received, the server 200 determines a weather information service domain among the plurality of domains as a domain for providing the environment condition information based on the received service request. Thereafter, the server 200 may obtain environment condition information including the present weather information of a region through which the vehicle 10 passes among the plurality of environment condition information classified as the determined weather information service domain, and transmit the obtained environment condition information to the terminal device 100 of the vehicle 10 that transmitted the service request.

According to a still another embodiment, the terminal device 100 of the vehicle 10 may periodically transmit the service request including the present location information to the server 200 while the user travels to the destination set by the user.

The server 200 may obtain the environment condition information including current weather information of a region related to the current location of the vehicle 10 based on the location information included in the received service request among the stored plurality of environment condition state information, and transmit the obtained environment condition information to the terminal device 100 of the vehicle 10 that transmitted the service request.

Therefore, when the environment condition information is received from the server 200, the terminal device 100 of the vehicle 10 may display the weather UI 610 of the region where the current vehicle 10 is located on the weather UI 620 displayed on the screen based on the weather information for each region included in the received environment condition information.

The embodiment is not limited thereto, and the terminal device 100 of the vehicle 10 may output the weather condition of the region in which the current vehicle 10 is located as audio based on the weather information included in the environment condition information received from the server 200.

Figure 7:
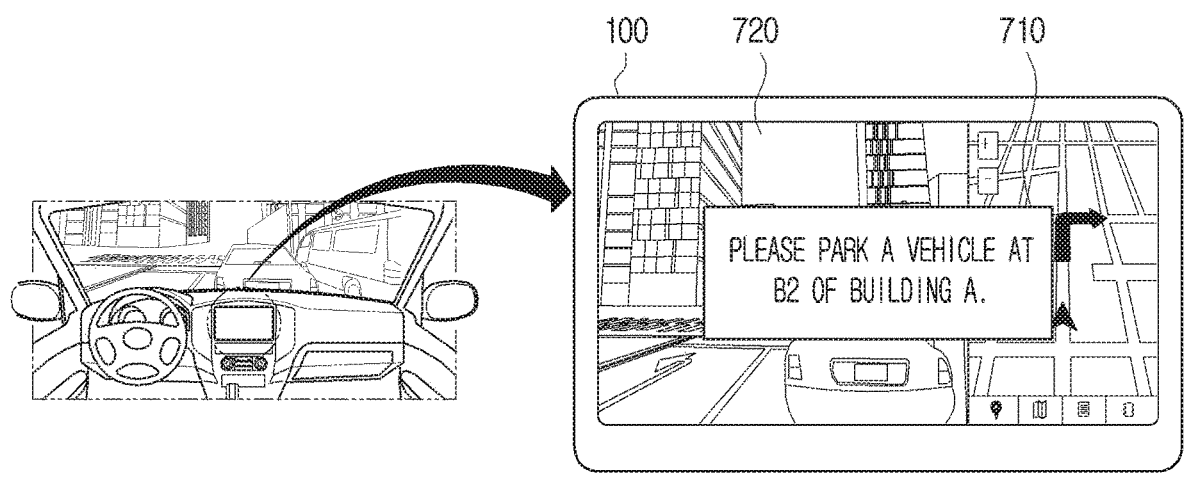
FIG. 7 is an exemplary diagram providing environment condition information according to a service request in a terminal device according to a still another embodiment.

FIG. 7 is an exemplary diagram providing environment condition information according to a service request in a terminal device according to a still another embodiment.

As illustrated in FIG. 7, the terminal device 100 of the vehicle 10 may display a parking information UI 710 on a screen based on the environment condition information received from the server 200.

The terminal device 100 of the vehicle 100 transmits, to the server 200, a service request including at least one of location information of the vehicle 10, location information and shop name information of the building set as a destination by the user according to a request by the user.

The terminal device 100 of the vehicle 10 transmits a service request including at least one of the location information and shop name information of the corresponding building to the server 200, if it is identified that the arrival time of the user at the building set to the destination is within a predetermined threshold time, or if the remaining distance from the current position of the vehicle 10 to the building set to the destination is within the predetermined threshold distance.

Accordingly, the server 200 obtains the environment condition information including the current parking condition information of the corresponding building based on at least one of location information and shop name information of the corresponding building included in the received service request among the stored plurality of environment condition information. Thereafter, the server 200 transmits the service request including the obtained environment condition information to the terminal device 100 of the vehicle 10 that transmitted the service request.

Specifically, the server 200 may classify sensing information and location information received from the terminal device 100 of the plurality of vehicles 10 by domains, and generate environment condition information for each domain based on sensing information and location information classified by domains.

Accordingly, when a service request is received from the terminal device 100 of the vehicle 10, the server 200 determines the parking information service domain among the plurality of domains as a domain for providing the environment condition information based on at least one of location information and shop name information of the building included in the received service request.

Thereafter, the server 200 may obtain the environment condition information including the parking condition information of the building set as the destination among the plurality of environment condition information classified as the determined parking information service domain, and transmit the obtained environment condition information to the terminal device 100 of the vehicle 10 that transmitted the service request.

When the environment condition information is received from the server 200, the terminal device 100 of the vehicle 10 may display the parking information UI 710 of the building set as the destination on a map UI 720 displayed on the screen based on the parking condition information included in the received environment condition information.

The embodiment is not limited thereto, and the terminal device 100 of the vehicle 10 may output the parking information of the building set as the destination as audio based on the parking condition information included in the environment condition information received from the server 200.

The terminal device 100 of the vehicle 10 may provide not only the parking information UI 710 but also the weather UI 610 as illustrated in FIG. 6, based on the environment condition information received from the server 200.

Specifically, when a service request is received from the terminal device 100 of the vehicle 10, the server 200 compares the location information of the vehicle 10 included in the received service request and the location information of the building set as the destination to determine whether the building set as the destination is present in the same region as the present location of the vehicle 10.

As a result of determination, if the vehicle and the building are present in the same region, the server 200 transmits the environment condition information including the parking condition information of the building set as a destination to the terminal device 100 of the vehicle 10 transmitting the service request.

If it is determined that the vehicle and the building are not within the same region, the server 200 may transmit the environment condition information including the present weather information of the region where the corresponding building is located among the plurality of environment condition information classified as the weather information service domain among the plurality of domains, and the environment condition information including the obtained parking condition information of the corresponding building to the terminal device 100 of the vehicle 10 transmitting the service.

Accordingly, the terminal device 100 of the vehicle 10 can display the weather information UI 610 for providing the weather information of the region where the building is located based on the environment condition information received from the server 200, and the parking information UI 710 for providing the parking information of the corresponding building on the map UI 720.

Figure 8:
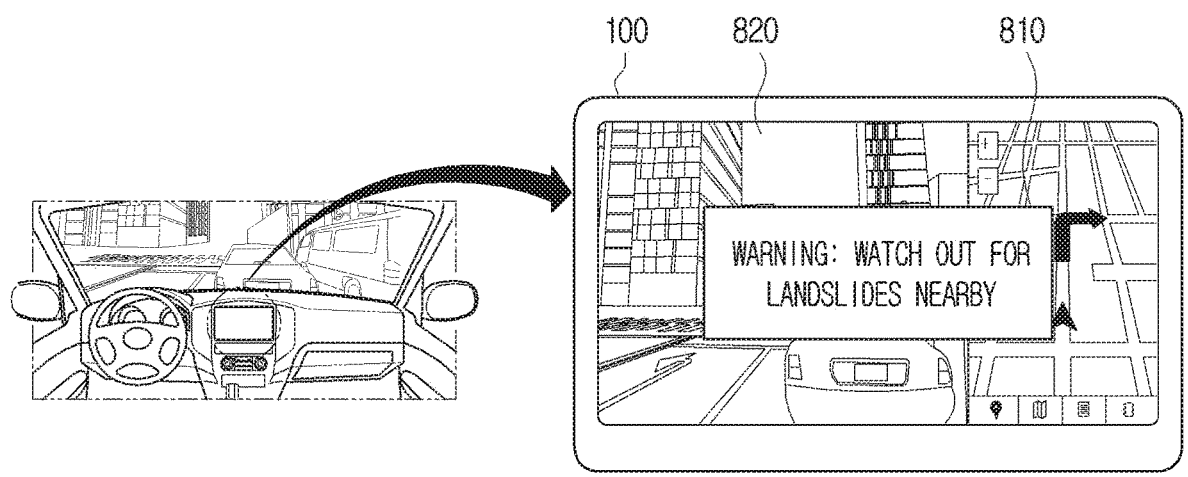
FIG. 8 is an exemplary diagram providing environment condition information according to a service request in a terminal device according to a still another embodiment.

FIG. 8 is an exemplary diagram providing environment condition information according to a service request in a terminal device according to a still another embodiment.

As illustrated in FIG. 8, the terminal device 100 of the vehicle 10 may display a risk occurrence notification UI 810 on a screen based on the environment condition information received from the server 200.

The terminal device 100 of the vehicle 10 transmits, to the server 200, a service request for the risk factor occurring in the travel route from the present location of the vehicle 10 to the destination according to a user's request.

The service request may include the present location information and travel route information to the destination of the vehicle 10, and the risk factor may include traffic accidents among vehicles, disaster occurrence, virus occurrence, or the like.

When a service request for a risk factor is received from the terminal device 100 of the vehicle 10, the server 200 selects a risk occurrence service domain among the plurality of domains according to the received service request. The server 200 obtains environment condition information of a region related to the travel route information included in the service request among the environment condition information classified as the selected risk occurrence service domain, and transmits the acquired environment condition information to the terminal device 100 of the vehicle 10 that transmitted the service request.

Accordingly, the terminal device 100 of the vehicle 10 can display the risk occurrence notification UI 810 on the map UI 820 displayed on the screen based on the risk occurrence information included in the environment condition information received from the server 200.

The terminal device 100 of the vehicle 10 may provide not only a risk occurrence notification UI 810 but also the weather UI 610 illustrated in FIG. 6, based on the environment condition information received from the server 200.

When a service request including the present location information of the vehicle 10 and the travel route information from the terminal device 100 of the vehicle 10 to the destination is received from the terminal device 100 of the vehicle 10, the server 200 determines the weather information service domain and the risk occurrence service domain, among the plurality of domains, as a domain for providing the environment condition information related service according to the received service request.

As described above, the server 200 may transmit the environment condition information including the environment condition information obtained on the risk occurrence service domain and the present weather information of the region related to the travel route information among the environment condition information classified as the weather information service domain to the terminal device 100 of the vehicle 10 that transmitted the service request.

The terminal device 100 of the vehicle 10 may display the weather UI 610 for providing weather information for each region on the travel route based on the environment condition information received from the server 200, and the risk occurrence notification UI 810 for guiding the occurrence of the risk factors for each region on the corresponding travel route on the map UI 720.

Figure 9:
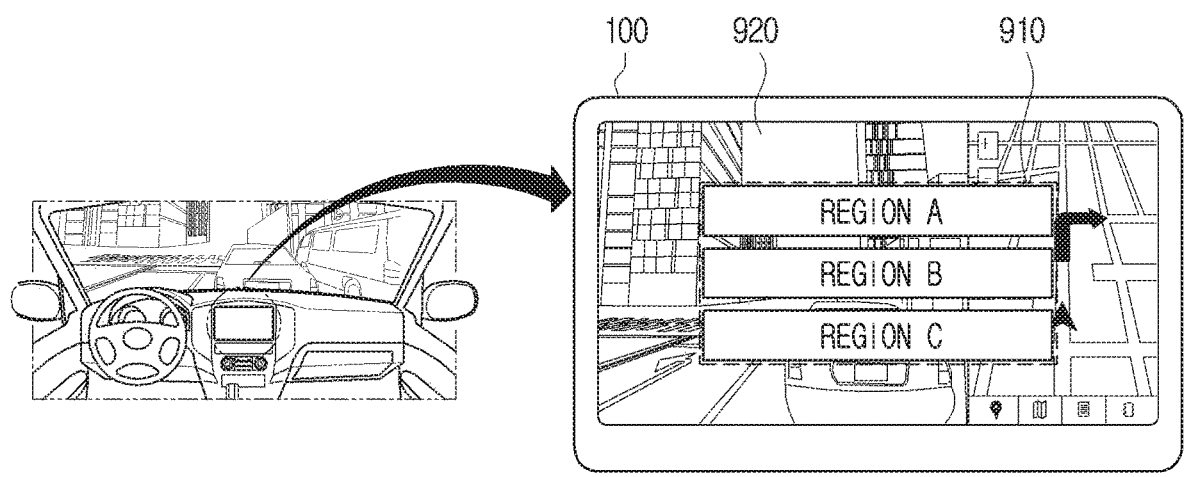
FIG. 9 is an exemplary diagram providing environment condition information according to a service request in a terminal device according to a still another embodiment.

FIG. 9 is an exemplary diagram providing environment condition information according to a service request in a terminal device according to a still another embodiment.

As illustrated in FIG. 9, the terminal device 100 of the vehicle 10 may display a region recommendation UI 910 on a screen based on the environment condition information received from the server 200.

The terminal device 100 of the vehicle 10 transmits a service request related to recommendation of a region including the present location information of the vehicle 10 to the server 200 upon request of the user.

When the service request related to the region recommendation is received from the terminal device 100 of the vehicle 10, the server 200 analyzes the present environment condition information for each region classified by the plurality of domains according to the received service request, and obtains the environment condition information of at least one region in which the risk factors have not occurred.

The server 200 transmits the obtained environment condition information to the terminal device 100 of the vehicle 10 transmitting the service request. The environment condition information may include the location information of a region.

The terminal device 100 of the vehicle 10 may provide the region recommendation UI 910 based on the environment condition information received from the server 200 and when the region recommendation UI 910 is selected, the terminal device 100 may provide a route guide service by setting the location information included in the received environment condition information as a destination.

For example, the terminal device 100 of the vehicle 10 may display the region recommendation UI 910 corresponding to the A, B, and C regions based on the environment condition information received from the server 200. When the user selection command for the region A is input while the same region recommendation UI 910 is displayed, the terminal device 100 of the vehicle 10 can provide route information for the region A through the displayed map UI 920.

Various embodiments for providing environment condition information to the terminal device 100 of the vehicle 10 in the server 200 have been described in detail. Hereinafter, a method for providing environment condition information to the terminal device 100 of the vehicle 10 in the server 200 according to an embodiment will be described in detail.

Figure 10:
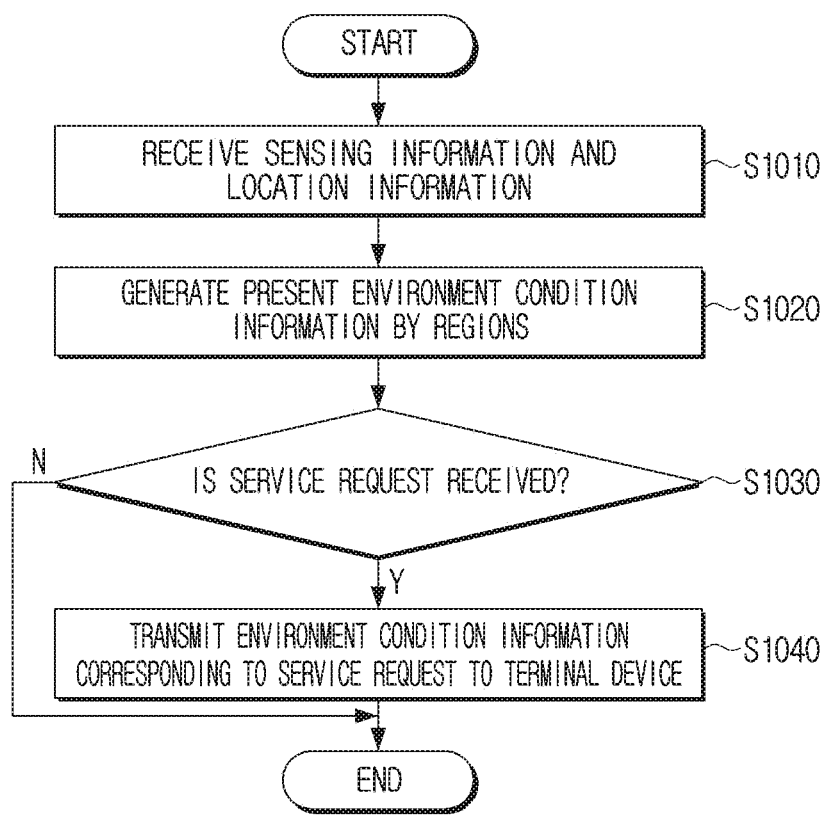
FIG. 10 is a flowchart of an information provision method according to an embodiment.

FIG. 10 is a flowchart of an information provision method according to an embodiment.

As illustrated in FIG. 10, the server 200 receives location information of the vehicle 10 and the sensing information detected by the terminal devices 100 of the vehicles from the terminal devices 100 of the plurality of vehicles 10. In operation 51010.

The server 200 generates the present environment condition information by regions using location information of the vehicle 10 and the sensing information received from the terminal devices 100 of the plurality of vehicles 10 in operation S1020.

When a service request is received from at least one of the terminal devices 100 of the plurality of vehicles 10, the server 200 transmits the environment condition information to the terminal device 100 transmitting the service request in operation S1030.

The sensing information may include at least one of the raindrop detecting information, wiper operation information, illuminance information, or atmospheric pollution information. The environment condition information may include present weather information by regions.

The server 200 may transmit the environment condition information including the present weather information by regions to the terminal device 100 of the vehicle 10 transmitting the service request through the embodiments below.

According to one embodiment, when a service request including location information is received from the terminal device 100 of the vehicle 10, the server 200 obtains environment condition information of a region related to the location information of the vehicle 10, and transmits the acquired environment condition information to the terminal device 100 of the vehicle 10 that transmitted the service request.

According to another embodiment, when a service request including destination information is received from the terminal device 100 of the vehicle 10, the server 200 obtains environment condition information of a region related to the destination information included in the service request, and transmits the acquired environment condition information to the terminal device 100 of the vehicle 10 that transmitted the service request.

According to another embodiment, when a service request including travel route information from the terminal device 100 of the vehicle 10 to a destination is received from the terminal device 100 of the vehicle 10, the server 200 obtains environment condition information for each region related to the travel route information included in the service request. Thereafter, the server 200 transmits the acquired regional environment condition information to the terminal device 100 of the vehicle 10 that transmitted the service request.

According to additional aspects of the disclosure, the sensing information may further include at least one of air pressure information for the tire of the vehicle 10, vibration intensity information, acceleration information, capturing information, or infrared sensing information.

In this case, the server 200 may classify the sensing information received from the terminal device 100 of the plurality of vehicles 10 by the predetermined domains, and generate environment condition information for each domain based on the sensing information classified by domains and the location information of the vehicle 10.

The domain may include at least one of the weather information service domain, atmospheric information service domain, parking information service domain, traffic information service domain, or risk occurrence service domain.

Specifically, when a service request is received from the terminal device 100 of the vehicle 10, the server 200 may determine a domain corresponding to the received service request, and transmit the environment condition information corresponding to the service request received on the determined domain to the terminal device 100 of the vehicle 10 that transmitted the service request.

The information provision method of the server 200 as described above may be implemented as at least one execution program, and the execution program may be stored in a non-transitory computer readable medium.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in various types of a recordable medium readable by a terminal such as a random access memory (RAM), a flash memory, a read only memory (ROM), erasable programmable ROM (EPROM), electronically erasable and programmable ROM (EEPROM), a register, a hard disk, a removable disk, a memory card, a universal serial bus (USB), CD-ROM, or the like.

The embodiments have been described based on preferred embodiments.

The above description is merely illustrative of the technical idea of the disclosure, and it will be understood by those of ordinary skill in the art that various changes in form and details may be made therein without departing from the spirit and scope of the disclosure. In addition, the embodiments disclosed herein are not intended to limit the scope of the disclosure but to describe the technical spirit of the disclosure, and the scope of the technical spirit of the disclosure is not limited by the embodiments. Therefore, the scope of the disclosure is to be construed according to the following claims, and all the technical spirits within the equivalent scope is within the scope of the appended claims

What is claimed is:

1. A method for information provision, the method comprising:
   receiving, from a terminal device of a vehicle, sensing information and location information detected by the terminal device of the vehicle;
   identifying moving route information from a present location to a destination based on the sensing information and the location information;
   generating present environment condition information by regions related to the moving route information based on the received sensing information, location information and the identified moving route information; and
   based on a service request being received from the terminal device of the vehicle, transmitting the present environment condition information by regions related to the moving route information to the terminal device of the vehicle.

2. The method of claim 1,
   wherein the sensing information comprises at least one of raindrop detection information, wiper operation information, illuminance information, atmospheric pollution, or temperature information, and
   wherein the present environment condition information comprises present weather information by regions.

3. The method of claim 2, wherein the transmitting comprises, based on a service request comprising location information being received from the terminal device of the vehicle, obtaining environment condition information of a region related to the location information of the vehicle and transmitting the obtained environment condition information to the terminal device of the vehicle.

4. The method of claim 2, wherein the transmitting comprises, based on receiving a service request comprising destination information from the terminal device of the vehicle, obtaining environment condition information of a region related to the destination information of the vehicle and transmitting the obtained environment condition information to the terminal device of the vehicle.

5. The method of claim 2,
   wherein the sensing information further comprises at least one of air pressure information, vibration intensity information, acceleration information, capturing information, or infrared sensing information, and
   wherein the generating comprises classifying the sensing information by predetermined domains and generating environment condition information by the domains based on the sensing information classified by the domains and the location information.

6. The method of claim 5, wherein the domains comprise at least one of a weather information service domain, an atmospheric information service domain, a parking information service domain, a traffic information service domain, or a risk occurrence service domain.

7. The method of claim 5, wherein the transmitting comprises, based on a service request being received from the terminal device of the vehicle, determining a domain corresponding to the received service request and transmitting the present environment condition information corresponding to the service request of the vehicle to the terminal device of the vehicle on the determined domain.

8. A server comprising:
   a communicator configured to communicate with a terminal device of a vehicle; and
   a processor configured to:
   receive sensing information and location information detected by the terminal device of the vehicle from the terminal device of the vehicle,
   identify moving route information from a present location to a destination based on the sensing information and the location information,
   based on sensing information and location information detected by the terminal device of the vehicle being received through the communicator, generate present environment condition information by regions related to the moving route information based on the received sensing information, location information and the identified moving route information, and
   based on a service request being received from the terminal device of the vehicle, control the communicator to transmit the present environment condition information by regions related to the moving route information to the terminal device of the vehicle.

9. The server of claim 8,
wherein the sensing information comprises at least one of raindrop detecting information, wiper operation information, illuminance information, atmospheric pollution information, or temperature information, and
wherein the present environment condition information comprises present weather information by regions.

10. The server of claim 9, wherein the processor is configured to:
based on receiving a service request comprising destination information from the terminal device of the vehicle, obtain environment condition information of a region related to the destination information of the vehicle, and control the communicator to transmit the obtained environment condition information to the terminal device of the vehicle.

11. The server of claim 9, wherein the processor is configured to:
based on a service request comprising information on a moving route received from the terminal device of the vehicle, obtain environment condition information related to destination information of the vehicle and control the communicator to transmit the obtained environment condition information to the terminal device of the vehicle.

12. The server of claim 9,
wherein the sensing information further comprises at least one of air pressure information, vibration intensity information, acceleration information, capturing information, or infrared sensing information, and
wherein the processor is configured to classify the sensing information by determined domains and generate environment condition information by the domains based on the sensing information classified by the domains and the location information.

13. The server of claim 12, wherein the domains comprise at least one of a weather information service domain, an atmospheric information service domain, a parking information service domain, a traffic information service domain, or a risk occurrence service domain.

* * * * *